Dec. 29, 1936.                G. W. VON HOFE ET AL                2,066,130
                                  CUP MAKING MACHINE
                              Filed Nov. 7, 1935           2 Sheets-Sheet 1
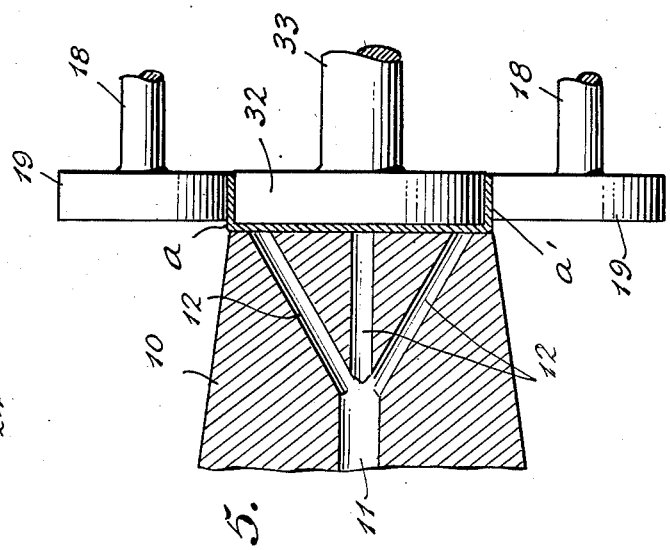
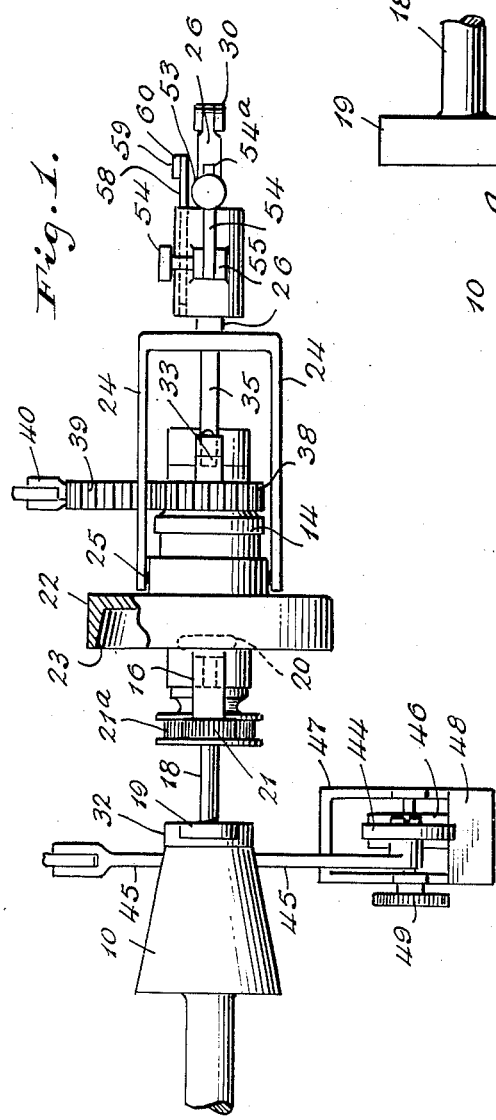
INVENTORS
GEORGE W. VON HOFE
PAUL W. FLEISCHER
BY
ATTORNEYS Dec. 29, 1936.  G. W. VON HOFE ET AL  2,066,130
CUP MAKING MACHINE
Filed Nov. 7, 1935   2 Sheets-Sheet 2
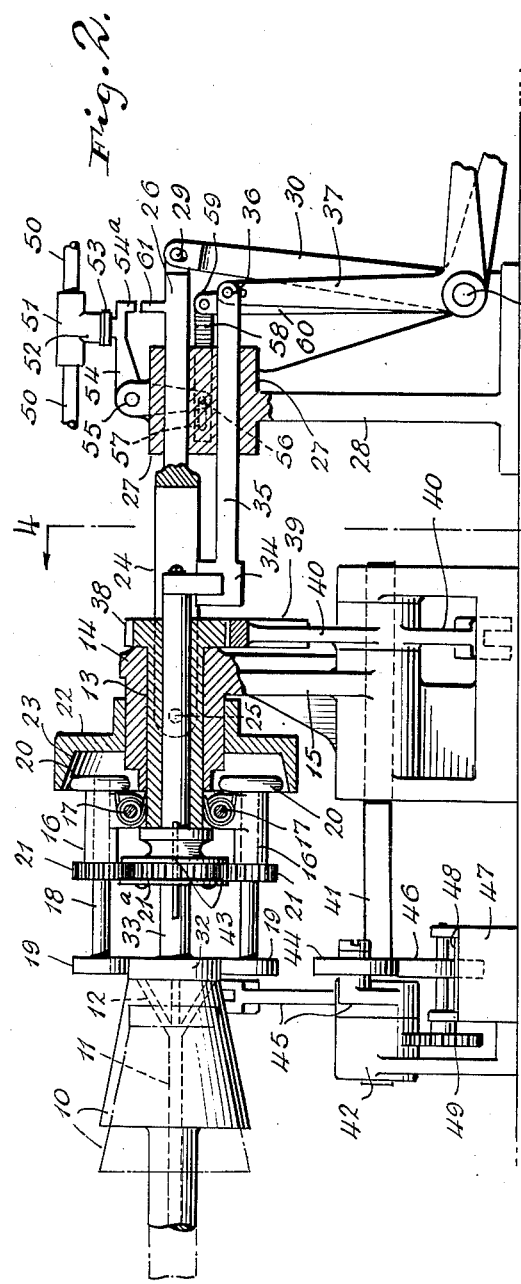
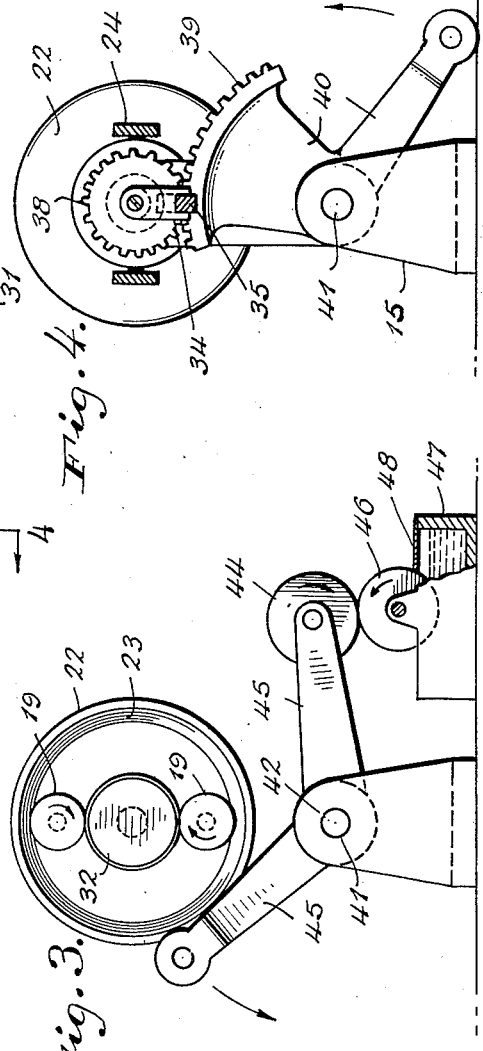
INVENTORS
GEORGE W. VON HOFE
PAUL W. FLEISCHER
BY
ATTORNEYS Patented Dec. 29, 1936

2,066,130

UNITED STATES PATENT OFFICE 2,066,130

CUP MAKING MACHINE

George W. von Hofe, Bound Brook, and Paul W. Fleischer, Weehawken, N. J., assignors to New Jersey Machine Corporation, Hoboken, N. J., a corporation of New Jersey Application November 7, 1935, Serial No. 48,632

14 Claims. (Cl. 93—36.4)

The invention relates to cup making machines and more particularly to that type of such machines which are designed to produce paper cups or equivalent containers consisting of two pieces, that is a body and a bottom combined therewith.

The invention has for its object to provide machines of the indicated class with a novel and simple gluing means whereby adhesive may be applied in an efficient and economical manner to permit the bodies and bottoms to be firmly secured together in the production of the individual cups or equivalent containers.

Other more specific objects of the invention will appear from the description hereinafter and the features of novelty will be pointed out in the claims.

In the accompanying drawings, which illustrate an example of the invention without defining its limits, Fig. 1 is a plan view, partly in section, including parts of the cup making machine; Fig. 2 is a longitudinal sectional elevation of Fig. 1; Fig. 3 is an end elevation of the gluing means; Fig. 4 is a cross-section on the line 4—4 of Fig. 2, and Fig. 5 is a detail view, on an enlarged scale, of parts of the mechanism.

The novel gluing means is designed for incorporation in machines for making two piece paper cups and equivalent containers, each consisting of a body and a bottom, adapted to be adhesively secured together to form complete units of predetermined character. The aforesaid gluing means is particularly adapted for combination with machines of the type which include one or more mandrels 10 tapered or otherwise formed to correspond to the body shape of the cups or equivalent containers intended to be produced by the particular machine. In describing the novel construction reference will be made to a single mandrel 10, it being understood that this is not done in any restricted sense, but merely for convenience of disclosure and in order to simplify the understanding of the essential features.

The mandrel 10 is mounted in the machine in any conventional manner for horizontal reciprocation by any customary mechanism suitable for the purpose, and in addition, may be otherwise controlled and operated in any well known way as may be required in the specific machine of which said mandrel 10 forms a part. The mandrel 10 is provided with an axial passage 11 communicating with one or more branch channels 12 terminating in the free end face of said mandrel 10 for the purpose to be more fully set forth hereinafter; the passage 11 further is connected with suitable air exhausting and valving means as will also be more clearly described hereinafter.

In its illustrated form the novel gluing means includes a sleeve 13 journaled in a bearing 14 carried by a bracket 15 which itself is suitably mounted in the machine of which the gluing means forms a part. A pair of bearings 16 located in diametrical opposed relation to each other are pivoted at 17 upon the sleeve 13 and constitute journals for the shafts 18 which carry glue wheels 19 as shown in Figs. 1 and 2. The shafts 18 also carry rollers 20 and at intermediate points are provided with gears 21 for the purpose to be more fully explained hereinafter; the rollers 20 and the gears 21, by engagement with the opposite ends of the bearings 16 maintain the shafts 18 against lengthwise movement therein without interfering with the rotation of said shafts 18 in said bearings 16. A control member 22 is slidably mounted upon the bearing 14 but held against rotation relatively thereto in any conventional manner and is interiorly provided with an annular cam surface 23 adapted to co-operate with the rollers 20 for adjusting the glue wheels 19 to and from their operative positions and vice versa.

As shown in the drawings, the control member 22 is slidably adjusted on the bearing 14 by means of a yoke 24 connected at 25 with said member 22 and forming part of or secured to a rod 26 slidably mounted in a bearing 27 carried by a bracket 28 suitably supported in the machine for making the cups or equivalent containers; the rod 26 at its free end is connected, preferably by means of a pin-and-slot connection 29, with a bell-crank lever 30 pivoted at 31 on the bracket 28, for instance as illustrated in Fig. 2. Any suitable and conventional means may be provided for rocking the lever 30 on its pivot 31 to slidably adjust the control member 22 in properly timed relation to the other operative parts of the gluing means; as the means for rocking the lever 30 may be of various and different types, it has not been deemed necessary to illustrate the same.

In addition to the parts so far described the gluing means includes a clamping plunger 32 located in axial registry with the mandrel 10 and carried by a shaft 33 slidably mounted in the sleeve 13 and suitably connected with the forked end 34 of an operating rod 35; the connection between the shaft 33 and the forked end 34 is such that the member 33 and plunger 32 are held against rotation relatively to the sleeve 13 without, however, interfering with the sliding movements of said shaft 33 in said sleeve 13. As shown in Fig. 2, the rod 35 in turn is slidably mounted in the bearing 27 and at its free end is attached, preferably by means of a pin-and-slot connection 36 with a bell-crank lever 37 which also is pivoted at 31 upon the bracket 28. The means whereby the lever 37 is rocked to slidably operate the plunger 32 in proper timing with the other elements of the gluing means may also be of any conventional type suitable for the purpose; as the means for rocking the lever 37 may also be of various and different types, it has also been considered unnecessary to show the same in the drawings. It will be understood that the mounting arrangement is such as to permit the levers 30 and 37 to be independently rocked by their respective operating means in proper operative timing with the other parts of the machine.

As shown in Figs. 1 and 2, the sleeve 13 at its one end is provided with a gear 38 which meshes with a segment 39 forming part of or secured to a bell-crank lever 40 pivotally mounted on a shaft 41 fixed in the bracket 15 and extending to and supported in a second bracket 42 as shown in Fig. 2; the lever 40 is controlled by suitable mechanism of any conventional arrangement to operate the segment 39 in the manner and for the purpose to be more fully described hereinafter. In order to actuate the glue wheels 19 in the operation of applying the adhesive carried thereby, a sun-gear 21a is mounted on the shaft 33 so as to be fixed thereon without, however, partaking of the sliding movements of said shaft 33 relatively to the sleeve 13; this result may be accomplished by means of discs 43 located in contact with opposite faces of the gear 21a and suitably fixed in place in the gluing means. The sun-gear 21a, as illustrated in Fig. 2, is in mesh with the previously mentioned gears 21 located upon the shafts 18 which carry the glue wheels 19.

For the purpose of supplying glue or other adhesive to the glue wheels 19 an adhesive transferring wheel 44 is provided, said wheel 44 being journalled upon a bell-crank lever 45 in such a manner as to be capable of rotation thereon in only one direction. The lever 45 is mounted on the shaft 41 adjacent the second bracket 42 and is controlled by suitable mechanism of any well known type adapted to rock said lever 45 on the shaft 41 in the desired manner. The adhesive transferring wheel 44 is arranged for rolling contact with a glue roll 46 rotatably supported in a glue reservoir 47 adapted to contain a supply of adhesive and provided with a scraper 48 for regulating the amount of adhesive picked up by the glue roll 46. In the preferred arrangement, the glue roll 46 is constantly rotated in the reservoir 47 during an operative period, in any customary manner as by a gear 49 and suitable co-operating mechanism.

In the operation of the gluing means so far described, the mandrel 10 initially occupies the position illustrated by dotted lines in Fig. 2 at which time the plunger 32 will also be located as indicated by dotted lines in said figure. As previously stated, the glue roll 46 is constantly rotating during an operative period of the machine, and consequently picks up adhesive from the supply of adhesive contained in the reservoir 47, it being understood that the scraper 48 regulates the amount of adhesive retained on the surface of the aforesaid roll 46. At the proper time in the operative cycle of the mechanism the adhesive transferring wheel 44 is brought into surface contact with the glue roll 46 by actuation of the lever 45 through the medium of the operating mechanism associated therewith which, as previously stated, may be of any suitable type. As a result of the engagement of the adhesive transferring wheel 44 with the glue roll 46, the wheel 44 will become covered on its peripheral surface with a coating of adhesive. By again suitably actuating the lever 45 in a return direction through the medium of its operating mechanism, the wheel 44 is swung to a position between and in radial registry with the glue wheels 19, it being understood that at this stage the glue wheels 19 are swung out of their operative positions by the action of the cam surface 23 of the control member 22 on the rollers 20, which control member 22 previously has been adjusted to effect this result. When the adhesive transferring wheel 44 has been positioned as last indicated above, the control member 22 is shifted to the position shown in Fig. 2, this adjustment being accomplished by moving the yoke 24 and rod 26 to the right in Fig. 2 through the medium of the bell-crank lever 30 which in turn is actuated in properly timed relation by its actuating mechanism which, as stated hereinbefore, may also be of any suitable type. As the control member 22 is thus adjusted the cam surface 23 thereof will be correspondingly shifted relatively to the rollers 20 and thereby will permit the glue wheels 19 to assume the position illustrated in Fig. 2 in which said wheels 19 will be in surface engagement with the adhesive transferring wheel 44. The lever 40 by means of its associated mechanism which also may be of any suitable type, will then be rocked on the pivot 41 to impart a pivotal movement of the segment 39 whereby the gear 38 will be rotatably actuated and in turn will correspondingly rotate the sleeve 13. This rotation of the sleeve 13 will carry the gears 21 in a circular path and cause said gears 21 to roll on the sun-gear 21a as will be apparent; as a result the glue wheels 19 will be similarly moved in a circular path and by the action of the gears 21 on the sun-gear 21a will at the same time be rotated about their individual axes and roll upon the surface of the adhesive transferring wheel 44. During this operation the sleeve 13 and its associated elements rotate through an arc of 180° so that the peripheral surfaces of the glue wheels 19 each become covered with a coating of adhesive because of their rolling contact with the adhesive transferring wheel 44. When the movements through the aforesaid arc of 180° have been completed, the control member 22 is shifted to the left in Fig. 2 by the action of the yoke 24, rod 26, lever 30 and the operating mechanism associated therewith so as to cause the cam surface 23 in co-operation with the rollers 20 to pivotally rock the bearings 14 in a direction to shift the glue wheels 19 away from the wheel 44 or, in other words, to spread the wheels 19 apart. The lever 45 is then operated in a direction to shift the adhesive transferring wheel 44 from the position previously occupied thereby between the rolls 19 back to the position in which, for instance, it may again contact with the glue roll 46 as shown in Fig. 3.

After this has happened, the mandrel 10 with a preformed bottom *a* held upon the end thereof by suction applied through the passage 11 and branch channels 12 is shifted to the right in Fig. 2 to the position shown by solid lines in which the preformed bottom *a* is located in the position occupied in the previous stage by the adhesive transferring wheel 44. By the action of its operating mechanism which also may be of any suitable type, the lever 37 at this stage is rocked on its pivot 31 in a direction to shift the rod 35 and its forked end 34 to the left in Fig. 2 and to correspondingly shift the member 33 and with it the plunger 32 so that at the end of these operative steps, the latter will be located within the preformed bottom $a$ with its periphery in engagement with the annular flange $a'$ of said bottom $a$ to form an internal support for said flange, as illustrated in Fig. 5. The control member 22 is then again shifted to the right by its associated mechanism to thereby correspondingly adjust the cam surface 23 and to permit the glue wheels 19 to again assume the position illustrated in Figs. 2 and 5 in which said rolls 19 are in engagement with the outer surface of the annular flange $a'$ of the preformed bottom $a$. When this adjustment has been completed the bell-crank lever 40 is actuated by its operating mechanism in a reverse direction to correspondingly operate the segment 39 and to thereby cause the gears 21 to roll on the sun-gear 21$a$ in a return movement. The glue wheels 19 will thereby again be correspondingly moved in a return direction through an arc of 180° and during such return movement will be rotated about their respective axis in rolling contact with the flange $a'$ of the preformed bottom $a$ and accordingly will transfer a line or coating of adhesive to the exterior surface of said flange $a'$ as will be apparent. At the proper time in the cycle of operations of the cup machine the control member 22 will again be shifted to the left in Fig. 2 and the mandrel 10 and plunger 32 will be shifted to the dotted line positions in said Fig. 2 after which the operations described above are repeated in proper timing relation to the other operative steps of the particular machine in which the glue means is embodied.

The illustrated example of the novel glue means also includes a detecting means to determine whether or not a preformed bottom $a$ or its equivalent is properly positioned on the end of the mandrel 10 before the application of adhesive as set forth above is commenced. As shown in the drawings, the passage 11 is connected with a suitable source of suction, for instance by means of a pipe 50, in which a valve 51 is located, said valve being provided with a depending portion 52 provided with a suitable air vent or opening in its lower face. This opening is opened and closed as required by means of a plate 53 carried by one arm of a bell-crank valve lever 54 pivotally mounted at 55 upon the bearing 27, as shown in Fig. 2. The other arm of the lever 54 is provided with a pin 56 projecting into a slot 57 of a link 58 pivotally connected at 59 with a bell-crank lever 60 which is pivotally mounted to rock on the pivot 31 and is controlled by operating mechanism of any suitable type adapted to perform the desired functions. The bell-crank valve lever 54 under certain conditions to be more fully set forth hereinafter co-operates with an abutment 61 located upon the rod 26 and for this purpose is provided at the end of its horizontal arm with a suitably formed projection 54$a$. When the parts occupy the positions illustrated in Fig. 2, the plate 53 of the valve lever 54 will close the opening in the valve portion 52 and the projection 54$a$ of the valve lever 54 will be out of the path of the abutment 61 as shown in Fig. 2.

The action of the mechanism last described is as follows:

When a preformed bottom $a$ is presented to the mandrel 10, the valve 51 will be closed by the plate 54 suction then being developed in the pipe 50, the valve 51, the passage 11 and the channels 12. If the aforesaid preformed bottom $a$ is properly positioned on the end of the mandrel 10 so as to seal the ends of the channels 12, a vacuum will be created in the valve 51 and the plate 53 will accordingly be retained in firm engagement with the valve portion 52 by external air pressure to completely close the valve 51 against the atmosphere. At the same time the link 58 is shifted to the left in Fig. 2, the pin 56 of the lever 54 sliding freely in the slot 57 of said link 58. Under such conditions the operations set forth above proceed in the manner described.

If, on the other hand, the preformed bottom $a$ is not properly positioned on the mandrel 10, or in other words, if the channels 12 are not completely covered thereby, the suction in the pipe 50 will be ineffective to produce a vacuum in the valve 51, and consequently the horizontal arm of the lever 54 will drop and thereby shift the plate 53 away from the valve portion 52 so as to uncover or open the vent or hole therein. This dropping of the aforesaid arm of the lever 54 will shift the pin 56 of the lever 54 to the left in the slot 57 of the link 58 and at the same time will cause the projection 54$a$ on the end of the horizontal arm of said lever 54 to engage the abutment 61 on the rod 26 and thereby prevent the control member 22 from being shifted to the right in Fig. 2. As a result of this, the glue wheels 19 will be held in their inoperative positions by the action of the cam surface 23 on the rollers 20 and said glue wheels 19 accordingly will be prevented from shifting into their operative positions; the possibility that adhesive may be unintentionally applied to parts of the mechanism or that a misplaced bottom $a$ will interfere with the intended operation of the mechanism will thereby be positively forestalled.

When the above conditions have been corrected by properly positioning a bottom $a$ upon the end of the mandrel 10, the lever 60 will be actuated to shift the link 58 to the right in Fig. 2 and thereby swing the lever 54 in a direction to again bring the plate 53 into engagement with the depending portion 52 of the valve 51 to close the vent or opening in said portion 52.

The gluing means and the associated detecting means which in some instances may be omitted if desired, are simple and reliable in construction and operation and serve to apply a coating or line of adhesive to the bottom in an efficient and economical manner and so that the parts of the container, that is the body and bottom of a cup, may be firmly secured together without requiring any particular effort or skill on the part of the operator. The gluing means further applies the adhesive in such a manner that any crevices which may result from the operation of producing the flange upon the bottom may be filled with adhesive to thereby insure a tight bottom closure in spite of said crevices. The novel gluing means further makes it possible to apply adhesive to the seam of the body at one station and the adhesive for the bottom at another station and thereby enables different adhesives to be used for these purposes to obtain a greater flexibility of operation and to permit a choice of adhesives having the most desirable characteristics for each operation. Furthermore, the detecting means provides a simple and effective arrangement to prevent the fouling of the operating parts of the mechanism with adhesive in the event that a bottom is not properly positioned for the application of such adhesive. The novel gluing means and detecting means may be easily incorporated in existing machines for making cups and other containers of the type under discussion to thereby increase the efficiency and operation of such machines.

Various changes in the specific forms shown and described may be made within the scope of the claims without departing from the spirit of the invention.

We claim:

1. In a machine for making containers consisting of a body and a flanged bottom, a mandrel, means for supporting a flanged bottom on the end of said mandrel, means for applying adhesive to the outer surface of the flange of said bottom while supported on said mandrel, and means arranged to interiorly support said flange while the adhesive applying means operatively engages the outer surface thereof.

2. In a machine for making cups consisting of a body and a flanged bottom, a mandrel, means for supporting a flanged bottom on the end of said mandrel, a plunger movable into said flanged bottom in interior supporting contact with the flange thereof, rotatable adhesive applying means, and means for actuating said adhesive applying means in rolling engagement with the outer surface of the flange of said bottom for applying a line of adhesive thereto.

3. In a machine for making cups consisting of a body and a flanged bottom, a mandrel, means for supporting a flanged bottom on the end of said mandrel, rotatable adhesive applying means, means for actuating said adhesive applying means in rolling engagement with the flange of said bottom for applying a line of adhesive thereto, and supporting means adapted to support the inner surface of said flange while said adhesive applying means operatively engages said flange.

4. In a machine for making containers consisting of a body and a flanged bottom, a mandrel, means for supporting a flanged bottom on the end of said mandrel, supporting means engaging the inner surface of said flange for supporting the latter, a pair of glue wheels, and means for moving said wheels circumferentially of said flange in rolling contact with the exterior surface thereof for applying adhesive thereto.

5. In a machine for making containers consisting of a body and a flanged bottom, a mandrel, means for supporting a flanged bottom on the end of said mandrel, supporting means engaging the inner surface of said flange for supporting the latter, a pair of glue wheels, means for moving said wheels circumferentially of said flange in rolling contact with the exterior surface thereof for applying adhesive thereto, and means for shifting said glue wheels into and out of operative adhesive applying position.

6. In a machine for making containers consisting of a body and a flanged bottom, a mandrel, means for supporting a flanged bottom on the end of said mandrel, supporting means engaging the inner surface of said flange for supporting the latter, a pair of glue wheels, and means for moving said wheels circumferentially of said flange and for coincidentally rotating said wheels on their respective axes in rolling contact with the exterior surface of said flange for applying adhesive thereto.

7. In a machine for making containers consisting of a body and a flanged bottom, a mandrel, means for supporting a flanged bottom on the end of said mandrel, supporting means engaging the inner surface of said flange for supporting the latter, a pair of glue wheels, means for moving said wheels circumferentially of said flange and for coincidentally rotating said wheels on their respective axes in rolling contact with the exterior surface of said flange for applying adhesive thereto, and means for shifting said glue wheels into and out of operative adhesive applying position.

8. In a machine for making containers consisting of a body and a flanged bottom, a mandrel, means for supporting a flanged bottom on the end of said mandrel, a plunger movable into said flanged bottom in interior supporting contact with the flange thereof, a rotatable sleeve, a pair of bearings mounted on said sleeve, glue wheels journalled in said bearings, means for rotating said sleeve whereby said glue wheels are moved in a circular path circumferentially of said bottom, and means for coincidentally rotating said glue wheels in said bearings in rolling contact with the exterior surface of said flange for applying adhesive thereto.

9. In a machine for making containers consisting of a body and a flanged bottom, a mandrel, means for supporting a flanged bottom on the end of said mandrel, a plunger movable into said flanged bottom in interior supporting contact with the flange thereof, a rotatable sleeve, a pair of bearings pivotally mounted on said sleeve, glue wheels journalled in said bearings, means for rotating said sleeve whereby said glue wheels are moved in a circular path circumferentially of said bottom, means for coincidentally rotating said glue wheels in said bearings in rolling contact with the exterior surface of said flange for applying adhesive thereto, and means for pivotally adjusting said bearings on said sleeve whereby said glue wheels are shifted into and out of operative adhesive applying position.

10. In a machine for making containers consisting of a body and a flanged bottom, a mandrel, means for supporting a flanged bottom on the end of said mandrel, a plunger movable into said flanged bottom in interior supporting contact with the flange thereof, a rotatable sleeve, a pair of bearings pivotally mounted on said sleeve, glue wheels journalled in said bearings, gears rotatably movable with said glue wheels, a stationary sun-gear in mesh with said gears, means for rotating said sleeve whereby said glue wheels are moved in a circular path circumferentially of said bottom and said gears are shifted circumferentially of said sun-gear to coincidentally rotate said wheels in said bearings in rolling contact with the exterior surface of said flange for applying adhesive thereto, and means for pivotally adjusting said bearings on said sleeve to shift said glue wheels into and out of operative adhesive applying position.

11. In a machine for making containers consisting of a body and a flanged bottom, a pair of spaced glue wheels in radial registry with each other, an adhesive transferring wheel, means for shifting said adhesive transferring wheel to and from an adhesive transferring position between said glue wheels, mechanism for initially moving said glue wheels in rolling contact with said adhesive transferring wheel to coat the peripheral surfaces of said glue wheels with adhesive, and a mandrel adapted to support a flanged bottom upon its end and movable to position said bottom between said glue wheels subsequent to the shifting of said adhesive transferring wheel from its adhesive transferring position, said mechanism subsequently moving said glue wheels in rolling contact with the flange of said bottom for applying adhesive thereto.

12. In a machine for making containers consisting of a body and a flanged bottom, a mandrel, means for supporting a flanged bottom on the end of said mandrel, adhesive applying means, adhesive transferring means movable into and out of operative relation to said adhesive applying means, and mechanism operating initially to transfer adhesive from said adhesive transferring means to said adhesive applying means and subsequent to the shifting of said adhesive transferring means out of operative relation to said adhesive applying means operating the latter to transfer adhesive from the adhesive applying means to the flange of said bottom.

13. In a machine for making containers consisting of a body and a flanged bottom, a mandrel, suction means for fixing a flanged bottom on the end face of said mandrel, means for applying adhesive to the flange of said bottom while fixed on said mandrel, means for adjusting said adhesive applying means to and from an operative position relatively to said flange, and means controlled by said suction means adapted to prevent said adjusting means from adjusting said adhesive applying means to its operative position in the absence or incorrect positioning of a bottom on said mandrel.

14. In a machine for making containers consisting of a body and a flanged bottom, a mandrel provided with a suction passage terminating in the end face of said mandrel, a suction line whereby suction is developed in said passage to hold a flanged bottom on said end face of the mandrel, means for applying adhesive to the flange of said bottom while held upon said end face of the mandrel, means for adjusting said adhesive applying means to and from an operative position relatively to said flange, a suction valve in said suction line, and a device controlled by said suction valve adapted to prevent the adjusting means from adjusting said adhesive applying means to its operative position in the absence or incorrect positioning of a bottom on the end face of said mandrel.

GEORGE W. von HOFE.
PAUL W. FLEISCHER.